United States Patent
Kerselaers et al.

(10) Patent No.: US 10,355,791 B1
(45) Date of Patent: Jul. 16, 2019

(54) WIRELESS DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/949,231

(22) Filed: Apr. 10, 2018

(51) Int. Cl.
*H04W 72/00* (2009.01)
*H04B 17/309* (2015.01)
*H04W 52/26* (2009.01)
*H04W 24/08* (2009.01)

(52) U.S. Cl.
CPC ......... *H04B 17/309* (2015.01); *H04W 24/08* (2013.01); *H04W 52/26* (2013.01)

(58) Field of Classification Search
CPC ..... H04B 17/309; H04W 24/08; H04W 52/26
USPC ..... 455/423, 67.11, 226.1, 452.2, 135, 161.3
See application file for complete search history.

(56) References Cited

U.S. PATENT DOCUMENTS

| | | | |
|---|---|---|---|
| 3,824,473 A | 7/1974 | Pye | |
| 6,055,420 A | 4/2000 | Veranth | |
| 8,019,303 B2 * | 9/2011 | Liu | H04L 27/2602 370/395.41 |
| 9,148,890 B1 * | 9/2015 | Choi | H04W 72/048 |
| 9,685,996 B1 | 6/2017 | Thoen | |
| 9,819,097 B2 | 11/2017 | Kerselaers et al. | |
| 2006/0019724 A1 * | 1/2006 | Bahl | G06F 1/3203 455/574 |
| 2008/0242346 A1 * | 10/2008 | Rofougaran | H04B 1/0067 455/552.1 |
| 2010/0086012 A1 * | 4/2010 | Rofougaran | H04B 1/406 375/219 |
| 2013/0121265 A1 * | 5/2013 | Awoniyi | H04W 24/10 370/329 |
| 2015/0319454 A1 | 11/2015 | Kerselaers et al. | |

* cited by examiner

*Primary Examiner* — Sonny Trinh (57) ABSTRACT

One example discloses a circuit for varying a quality-factor of a wireless device: wherein the wireless device includes an antenna tuning circuit and a communications signal interface; the circuit including, a quality-factor circuit having a feedback circuit; wherein the feedback circuit is configured to be coupled between the antenna tuning circuit and the communications signal interface; wherein the quality-factor circuit is configured to measure an antenna system bandwidth of the wireless device; and wherein the feedback circuit is configured to apply positive feedback to the antenna tuning circuit if the measured bandwidth is greater than a maximum communication signal bandwidth.

20 Claims, 7 Drawing Sheets

WIRELESS DEVICE

The present specification relates to systems, methods, apparatuses, devices, articles of manufacture and instructions for wireless devices.

SUMMARY

According to an example embodiment, a circuit for varying a quality-factor of a wireless device: wherein the wireless device includes an antenna tuning circuit and a communications signal interface; comprising, a quality-factor circuit having a feedback circuit; wherein the feedback circuit is configured to be coupled between the antenna tuning circuit and the communications signal interface; wherein the quality-factor circuit is configured to measure an antenna system bandwidth of the wireless device; and wherein the feedback circuit is configured to apply positive feedback to the antenna tuning circuit if the measured bandwidth is greater than a maximum communication signal bandwidth.

In another example embodiment, the maximum bandwidth varies with a type of communication signal received by the wireless device.

In another example embodiment, the type of communication signal is at least one of: an NFEMI signal, an NFMI signal, an NFEI signal, or an RF signal.

In another example embodiment, the feedback circuit is configured to increase the positive feedback if at least one of: a decrease in signal strength, amplitude distortion, phase distortion, non-linear group delay, or an antenna system bandwidth increase, is detected at the communications signal interface.

In another example embodiment, the feedback circuit is configured to decrease the positive feedback if oscillation in the wireless device is detected.

In another example embodiment, the quality-factor circuit is configured to measure the antenna system bandwidth between subsequent communication signal receptions within the wireless device.

In another example embodiment, the feedback circuit is configured to identify a level for the positive feedback from a table containing a set of positive feedback levels corresponding to a set of measured antenna system bandwidths.

In another example embodiment, the feedback circuit is configured to go into a standby mode if the measured bandwidth is less than the maximum communication signal bandwidth.

In another example embodiment, the feedback circuit is configured to increase a resistance in the antenna tuning circuit if the measured bandwidth is less than a minimum communication signal bandwidth.

In another example embodiment, the quality-factor circuit is configured to: inject a set of test signals into the antenna tuning circuit; measure a set of voltages generated by the antenna tuning circuit in response to the test signals; and determine the antenna system bandwidth of the wireless device based on a comparison between the test signals and the measured voltages.

In another example embodiment, at least one of the test signals is at a center frequency of the communication signal.

In another example embodiment, at least two of the test signals are equally offset from the center frequency.

In another example embodiment, further comprising the wireless device; and wherein the positive feedback decreases the antenna system bandwidth and increases a quality-factor of the wireless device.

In another example embodiment, the wireless device is at least one of: a wearable device, an earbud, a wristband, a smartwatch, or a sensor.

In another example embodiment, the wireless device is configured as a receiver.

According to an example embodiment, an article of manufacture including at least one non-transitory, tangible machine readable storage medium containing executable machine instructions for adjusting a bandwidth of a wireless device, comprising: wherein the wireless device includes an antenna tuning circuit and a communications signal interface; wherein the article includes a quality-factor circuit having a feedback circuit; wherein the feedback circuit is configured to be coupled between the antenna tuning circuit and the communications signal interface; wherein the instructions include, measuring an antenna system bandwidth of the wireless device; and applying positive feedback to the antenna tuning circuit if the measured bandwidth is greater than a maximum communication signal bandwidth.

In another example embodiment, the instructions further include: increasing a resistance in the antenna tuning circuit if the measured bandwidth is less than a minimum communication signal bandwidth.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are body communication and other wireless networked devices based on near-field electromagnetic induction (NFEMI), where the transmitter and receiver are coupled by both magnetic and electric fields. While RF wireless communication is accomplished by propagating an RF plane wave through free space, NFEMI communication utilizes non-propagating quasi-static fields.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space.

Near-field magnetic induction (NFMI) communication may also be used for such body communications, however these magnetic fields are not coupled to the body. As a result, these magnetic field devices can be farther away from the body than NFEMI devices and still ensure communication. The NFMI range however is much shorter than a full body due to small antenna sizes in wearable devices.

Small antenna geometries are efficient for NFMI and NFEMI antennas since they minimize radiating waves in free space.

Figure 1:
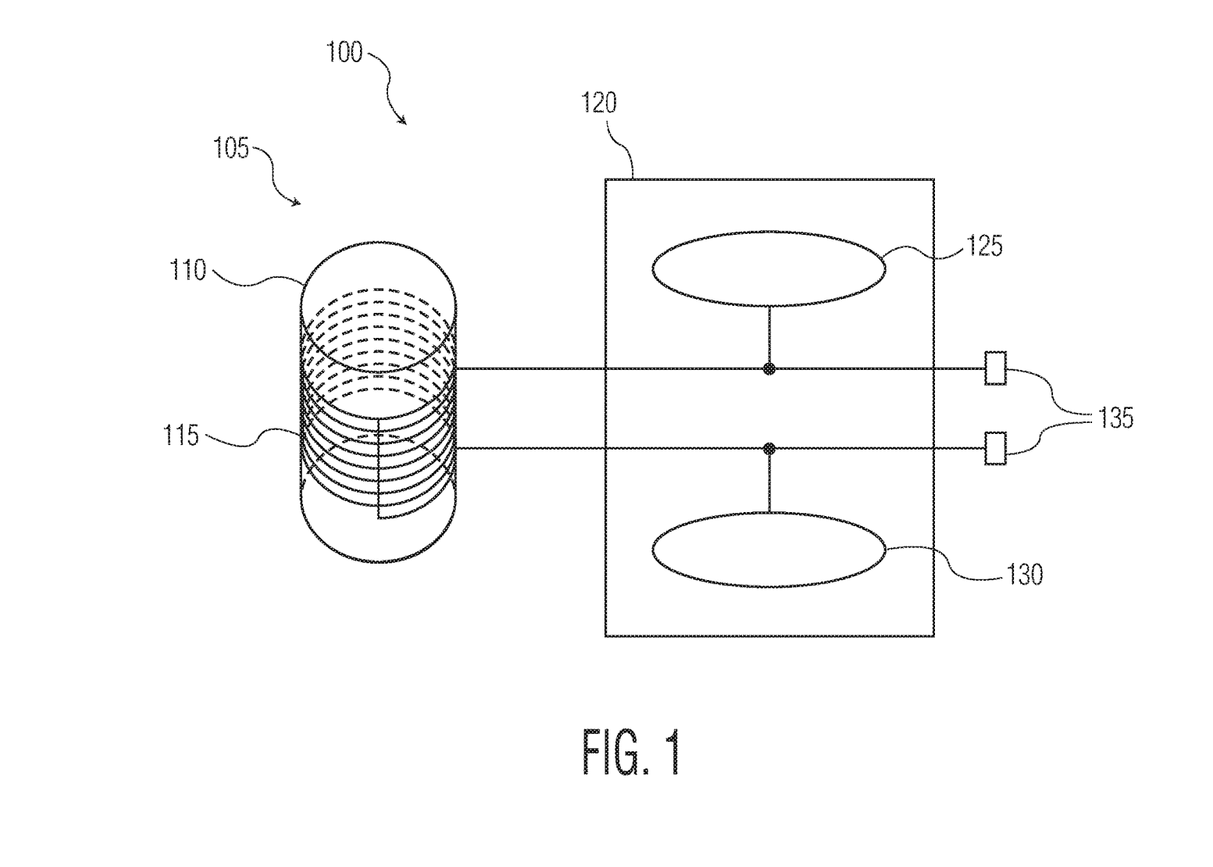
FIG. 1 is an example near-field electromagnetic induction (NFEMI) antenna for use in a wireless device.

FIG. 1 is an example near-field electromagnetic induction (NFEMI) antenna 100 for use in a wireless device. In some example embodiments, the antenna 100 includes a coil antenna 105 (i.e. for magnetic fields) in conjunction with a short loaded dipole 120 (i.e. for electric fields). The coil antenna 105 includes a ferrite core 110 wound with wire 115. The short dipole 120 include two loading plates 125 and 130. Antenna 100 feed points 135 are coupled to various transceiver circuitry (not shown).

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced.

Figure 2:
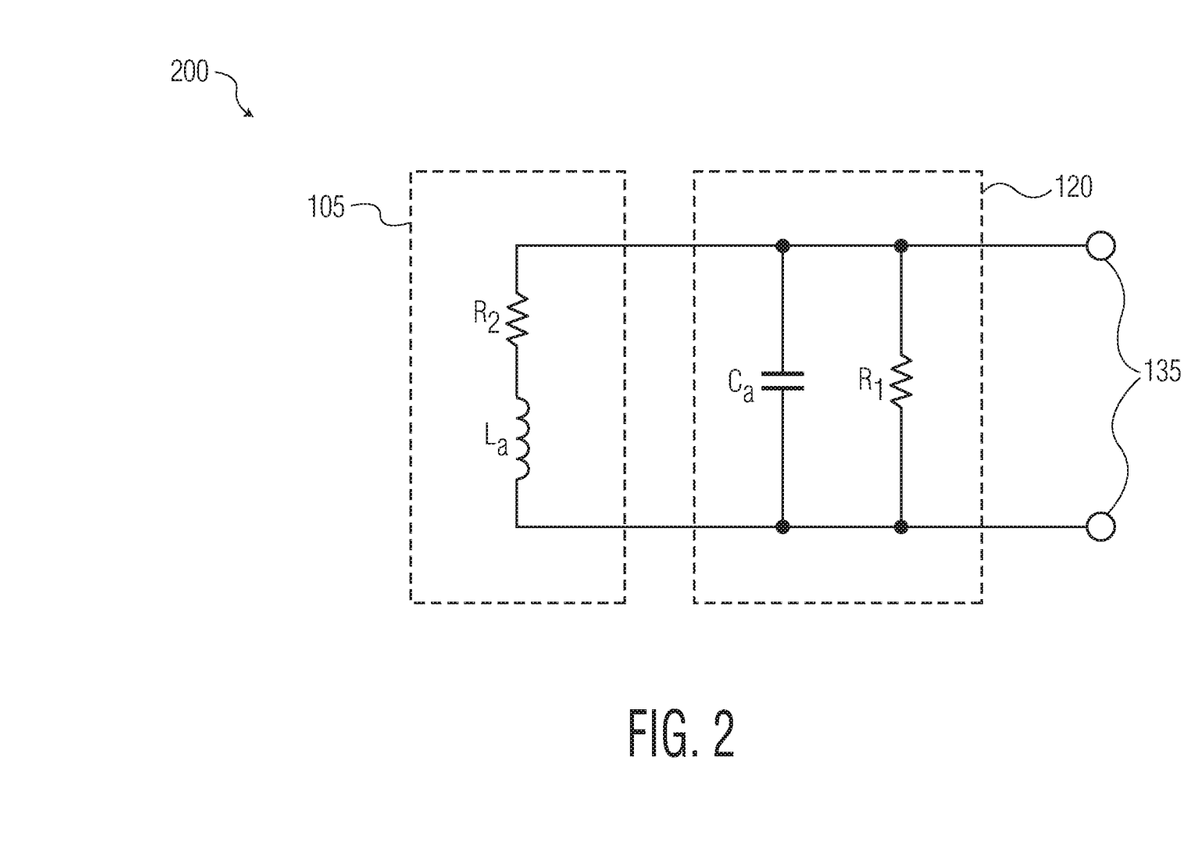
FIG. 2 is example idealized electrical equivalent of the NFEMI antenna.

FIG. 2 is an example idealized electrical equivalent 200 of the NFEMI antenna 100. The short loaded dipole portion 120 is idealized by a shunt circuit having a capacitance (Ca) and resistance (R1). The small loop antenna portion 105 is idealized by a series circuit having an inductance (La) and resistance (R2).

At or below 50 MHz, the short loaded dipole 120 is dominated by capacitance (Ca), and the small loop antenna 105 is dominated by inductance (La). In this example, the small loop antenna 105 and the short loaded dipole 120 are arranged as a parallel circuit, however other configurations are possible.

Figure 3:
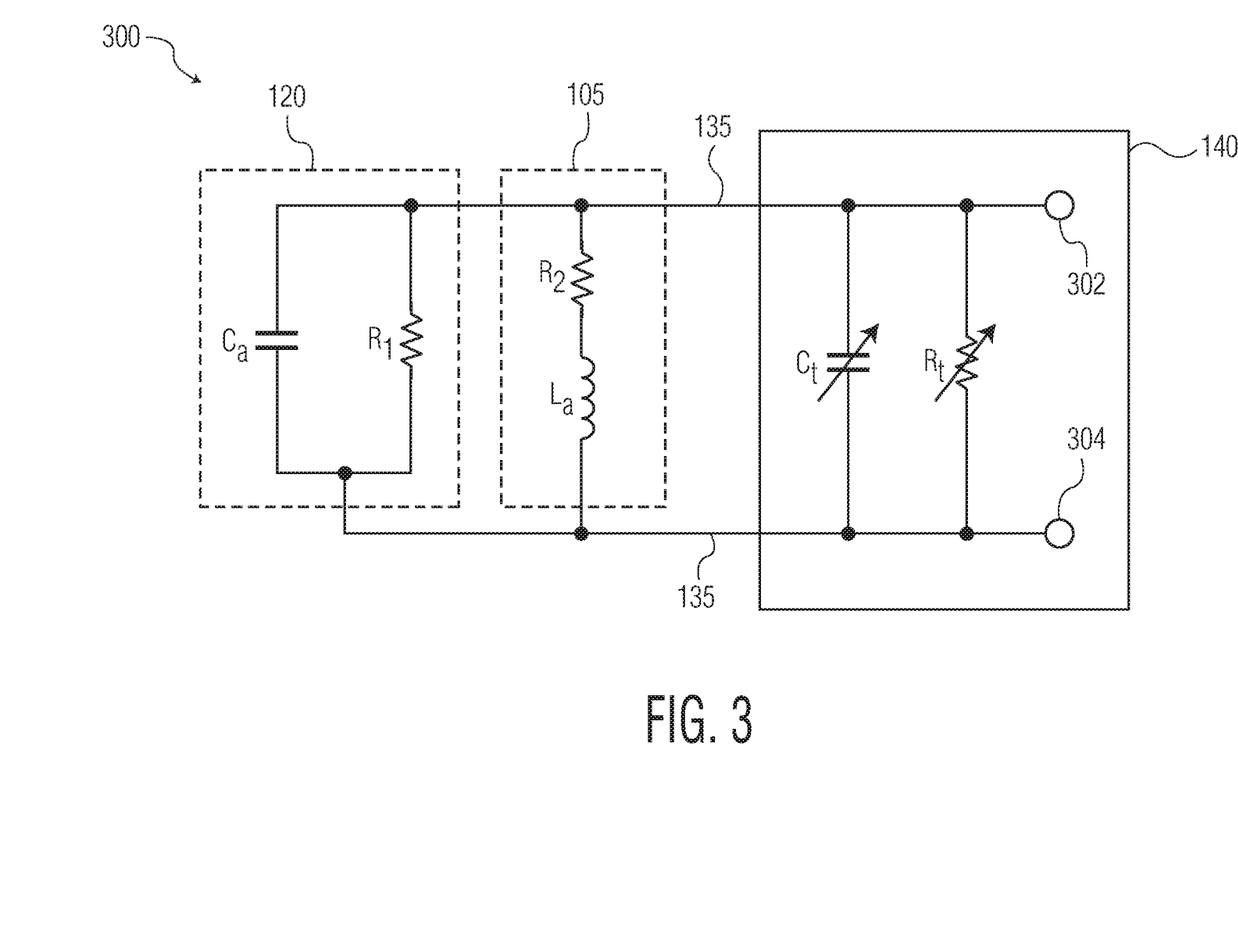
FIG. 3 is example front-end portion of a wireless device.

FIG. 3 is example front-end portion 300 of a wireless device. The front-end portion 300 includes the antenna 100 (shown as the idealized NFEMI antenna 200) coupled to a tuning circuit 140. The tuning circuit 140 includes a variable tuning capacitance (Ct) and a variable tuning resistance (Rt).

Together with the antenna 100, the tuning circuit 140 places the front-end portion 300 of the wireless receiver into resonance and sets a bandwidth for either transmitting received communications signals to, or receiving communications signals to be transmitted from, a back-end portion of the wireless device, as shown in subsequent Figures.

The front-end portion 300 is configured to be coupled to the back-end portion at points 302 and 304. Ct is varied by a controller and adjusts the resonance frequency. Rt is also varied by the controller and helps adjust the bandwidth (i.e. quality-factor/Q-factor) of the wireless device.

Figure 4:
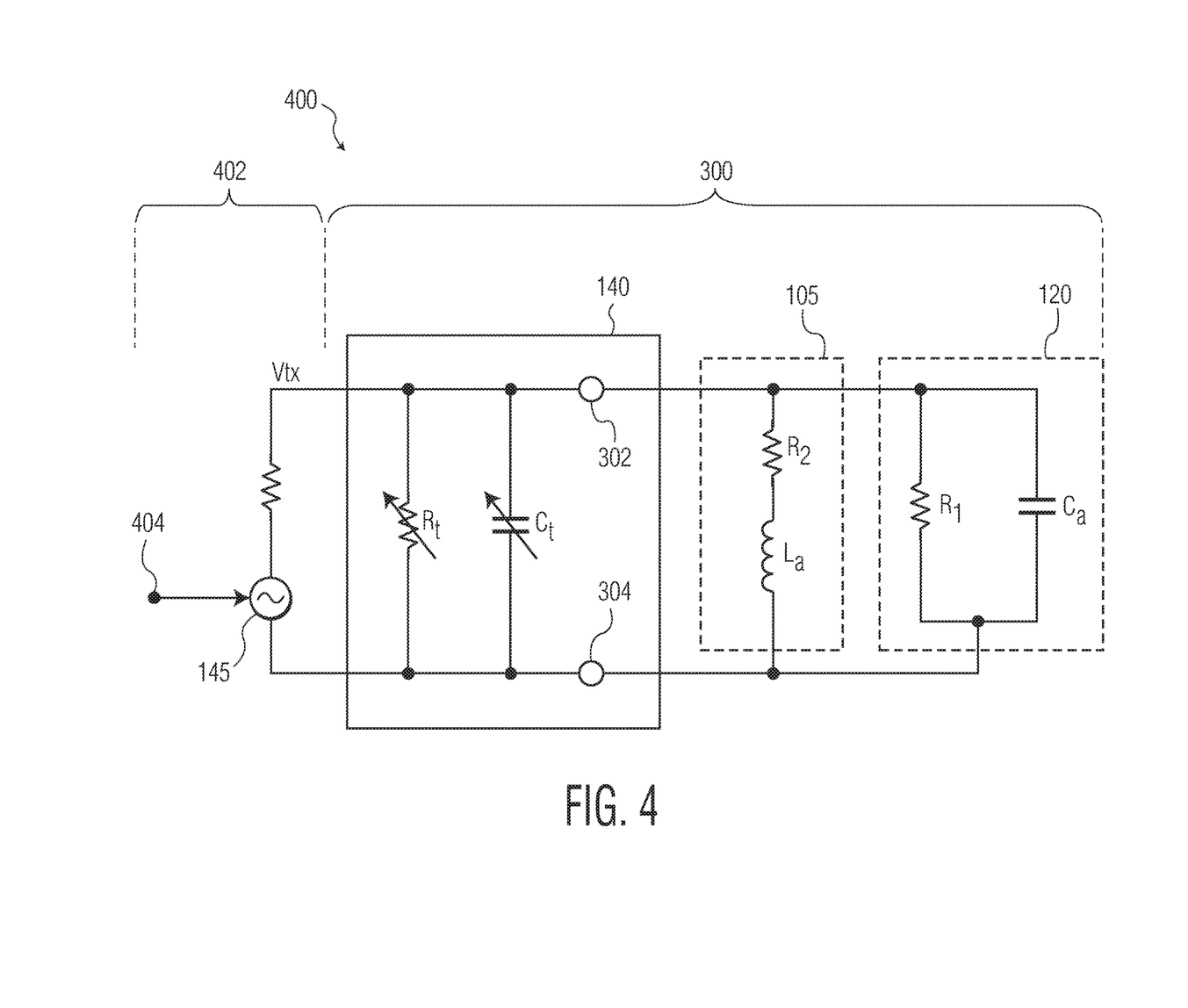
FIG. 4 is example of a wireless device configured to transmit a communications signal.

FIG. 4 is example 400 of a wireless device configured to transmit a communications signal. The example 400 shows the front-end portion 300 and the back-end portion 402 of the wireless device. The back-end portion 402 in transmit mode is represented by a voltage source 145 having an internal resistance shown by an equivalent resistor. The voltage source 145 is controlled by a communications signal interface 404. The communications signal interface 404 receives the communications signal from baseband circuits (not shown).

The voltage source 145 applies a voltage (Vtx) to the front-end portion 300 at points 302 and 304. Voltage (Vtx) across the small loop antenna 105 generates a current through the coil (La and R2). When a current in the coil is flowing, a magnetic field will be generated that is a linear function of the current through the coil. The voltage across the short loaded dipole 120 charges the loading plates (125, 130, aka. Ca and R1) and generates an electric field between the loading plates and its environment. The generated electric field is a linear function of the voltage across the loading plates 125 and 130.

Both fields are quasi static in nature and do not substantially radiate in the far field.

Figure 5:
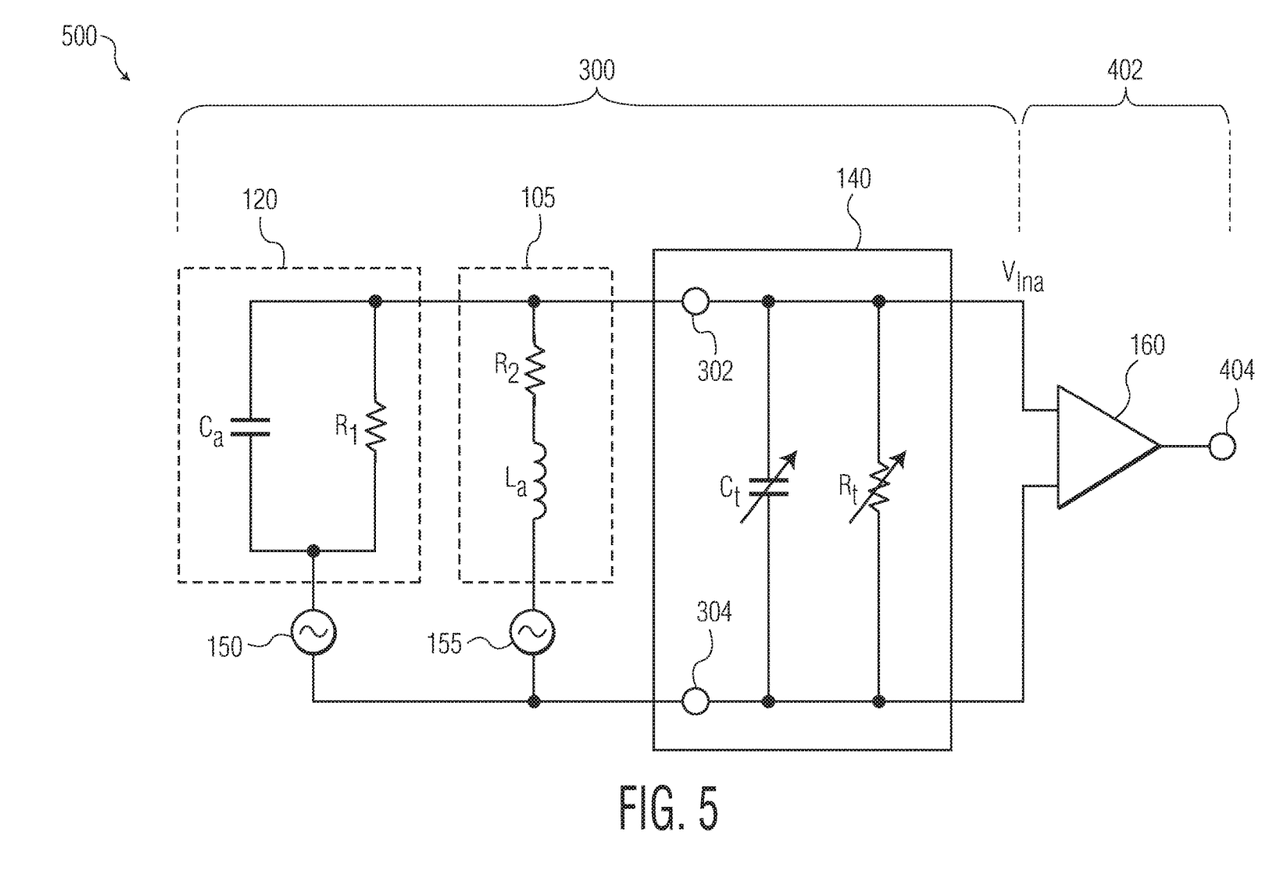
FIG. 5 is an example of a wireless device configured to receive a communications signal.

FIG. 5 is example 500 of a wireless device configured to receive a communications signal. The example 500 also shows the front-end portion 300 and the back-end portion 402 of the wireless device. The back-end portion 402 however is instead in receive mode.

Communications signals are received by the front-end portion 300 of the wireless device as magnetic and electric fields. The magnetic field received by the antenna coil portion 105 is represented by induced voltage 155. The electric field received by short loaded dipole 120 is represented by induced voltage 150.

The induced voltages 150 and 155 are combined, adjusted by the tuning circuit 140, and coupled to low noise amplifier (LNA) 160 in the back-end portion 402 of the wireless device. The LNA's 160 input has a high impedance characteristic while its output has a low impedance characteristic. The LNA 160 receives and amplifies the communications signal, represented by voltage (Vlna). The output of the LNA 160 is coupled to the communications signal interface 404. The communications signal interface 404 sends the communications signal to baseband circuits (not shown) for later baseband signal processing.

Because both induced voltages 150, 155 may have a 180 degrees phase relationship, they add together in a parallel antenna circuit combination. The induced voltage 150 in the short loaded dipole 120 will give rise to a portion of Vlna according the following calculation:

$$Vlna1 = Vinduced \times Q \times (Ca/(Ca+Ct)),$$

where Q is the quality-factor of the wireless device, Ca is the short loaded dipole portion 120 capacitance, and Ct is the tuning circuit 140 capacitance.

The induced voltage 155 in the antenna coil portion will give rise to a portion of Vlna according the following calculation:

$$Vlna2 = Vinduced \times Q,$$

where Q is the quality-factor of the wireless device and Vlna=Vlna1+Vlna2.

For example, in an earbud application, if an antenna capacitance is 3 pF, a tuning capacitor is 52 pF, and a combined induced voltage is 1 µV, then the voltage at the LNA 160 (Vlna) is 1.32 µV. In this example, the coil antenna portion 105 has a ferrite coil of 2 mm diameter and 6 mm length with an inductance of 3 µH, and the wireless device is tuned to a center frequency of 11 MHz with a bandwidth of 450 kHz.

However, wireless antennas in actual products like hearing aids, earplugs, and other wearables are limited in volume and size constrained. Their antennas (e.g. 105, 120) are positioned very close to mechanical components. Such mechanical and electromechanical components are at least partially electrical conductive, and thus additional loss is introduced in the wireless device leading to systems that may not effectively communicate.

This additional loss effectively increases resistance R2 and decreases resistance R1, resulting in bandwidth widening and quality-factor reductions that reduce the wireless device's communications range and increase group delay and inter-symbol interference, particularly, but not only, when receiving communications signals. An example of such interference are wireless devices where the magnetic antenna coil portion 105 is positioned very close (e.g. <0.1 mm) to the device's power source (e.g. battery).

As shown by the Vlna equation above, this voltage is linearly related to the antenna Q-factor. For example, due to integration of the antenna in an earbud the Q-factor is reduced from 25 to 12. This results in a degradation of 6 dB in received voltage (Vrx). The link budget may be defined as:

$$\text{Link Budget [dB]} = 20\log_{10}\left(\frac{V_{Rx}}{V_{Tx}}\right),$$

where VTx is the transmitter voltage on the VTx transmitter antenna and VRx is the received voltage on the receiver antenna. For a constant transmit voltage (Vtx), the link budget decreases linearly with the received voltage (Vrx) and as such the decrease is also 6 dB in this example.

If the wireless device's Q-factor could be increased when necessary (e.g. either in reception or transmission mode) more robust communication would be achieved, particularly for small wireless NFEMI or NFMI devices.

Figure 6:
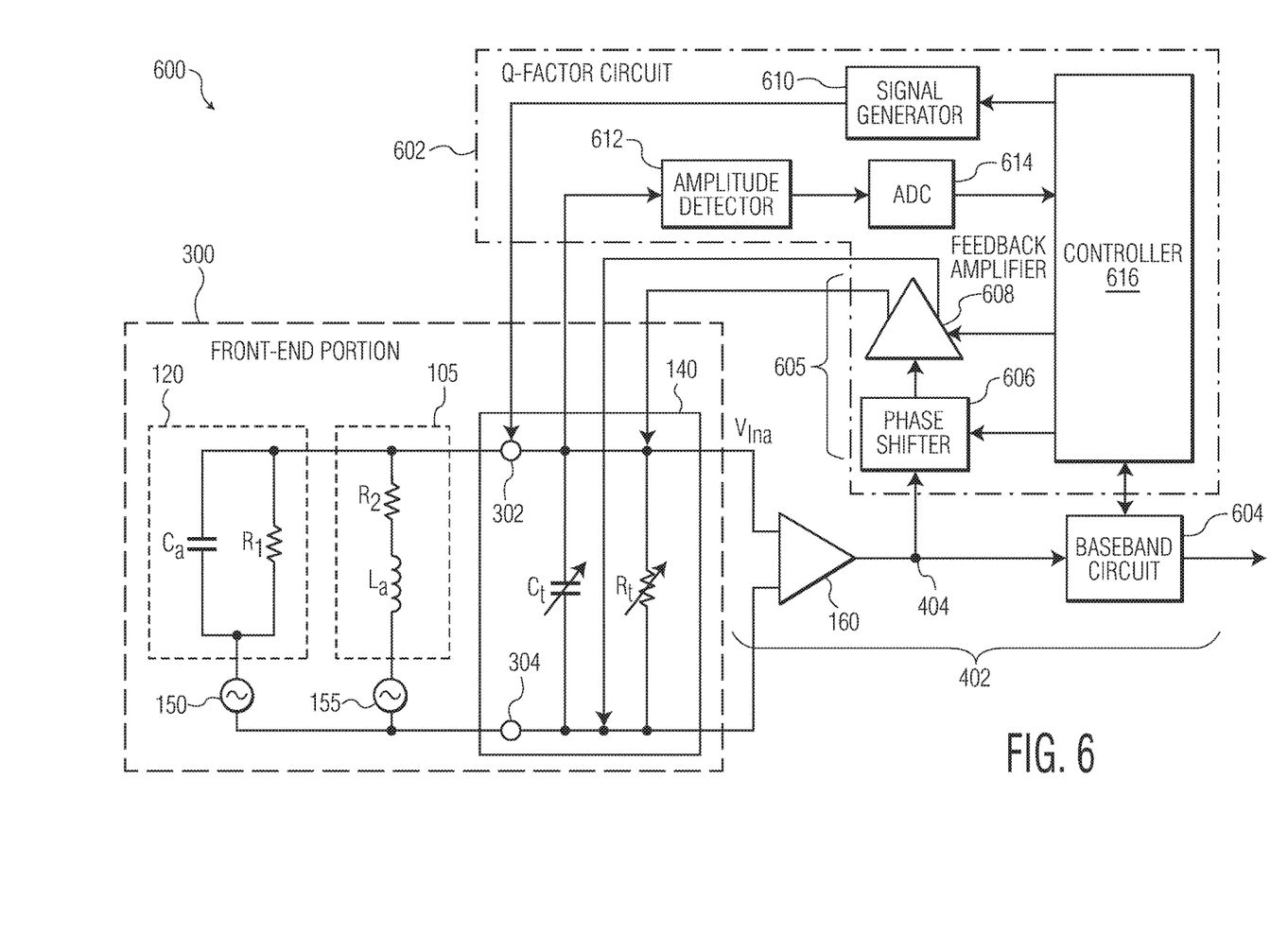
FIG. 6 is an example of a circuit for varying a quality-factor of a wireless device.

FIG. 6 is an example of a circuit for varying a quality-factor of a wireless device 600 configured to receive a communications signal. The wireless device 600 includes circuits for increasing the wireless device's 600 quality-factor (Q-factor) when necessary, enabling more robust communication, particularly for small wireless NFEMI or NFMI devices in receive mode.

The wireless device 600 includes the front-end portion 300 (introduced in FIG. 3) including the tuning circuit 140 having the variable tuning capacitance (Ct) and variable tuning resistance (Rt).

The wireless device 600 includes the back-end portion 402 (introduced in FIGS. 3 and 4). The back-end portion 402 in this example embodiment is configured in receive mode and includes the LNA 160 and a baseband circuit 604. The communications signal interface 404 is also shown.

The baseband circuits 604 in various example embodiments includes other radio functions such as frequency conversion, demodulation and/or other input/output processing functions. In some example embodiments all or part of the wireless device is embodied in a radio frequency communication integrated circuit (RF-IC.)

The wireless device 600 further includes a quality-factor circuit 602. The quality-factor circuit 602 includes a feedback circuit 605 (including a phase shifter 606 and a feedback amplifier 608), a signal generator 610, an amplitude detector 612, an analog to digital converter (ADC) 614, and a controller 616. The controller 616 in various examples includes a look-up table and/or instructions in memory.

The feedback circuit 605 is configured to be coupled between the antenna tuning circuit 140 and the communications signal interface 404. The quality-factor circuit 602 is configured to measure and adapt an antenna system bandwidth of the wireless device 600.

The feedback circuit 605 is configured to apply positive feedback to the antenna tuning circuit 140 if the measured bandwidth is greater than a maximum communication signal bandwidth, and to increase a resistance in the antenna tuning circuit 140 if the measured bandwidth is less than a minimum communication signal bandwidth.

Thus the quality-factor circuit 602 is dynamically and constantly adapting the level of positive feedback and tuning circuit 140 resistance as the wireless device 600 operates. For example, the quality-factor circuit 602 can be configured to measure the antenna system bandwidth between subsequent communication signal transmissions within the wireless device 600. However, if no corrections are required, the feedback circuit 605 can be placed into a standby mode to save power.

The maximum and minimum bandwidths vary with a type of communication signal received by and/or transmitted from the wireless device 600. The types of communication signal include: NFEMI signals, NFMI signals, NFEI (Near Field Electric Induction), and RF signals.

To avoid distortion, the wireless device 600 should have a bandwidth corresponding to the wireless signal's bandwidth. Such wireless signal bandwidth depends upon the wireless signal's modulation and data rate. Thus the feedback circuit 605 is in some example embodiments configured to also increase the positive feedback if at least one of: a decrease in signal strength, amplitude distortion, phase distortion, non-linear group delay, or antenna system bandwidth increase, is detected at the communications signal interface 404.

The feedback circuit 605 is configured to decrease the positive feedback if oscillation in the wireless device 600 is detected.

To optimize control, the feedback circuit 605 can in some example embodiments be configured to identify a level for the positive feedback from a table containing a set of positive feedback levels corresponding to a set of measured communication signal bandwidths.

In various example embodiments the controller 616 centrally controls all of the quality-factor circuit 602 functions as well as the variable tuning capacitance (Ct) and variable tuning resistance (Rt) in the tuning circuit 140. The phase shifter 606 ensures that the feedback signal, from the output of the low noise amplifier 160, is in phase with the LNA's 160 input signal between points 302 and 304. The amplitude detector 604 is coupled to sample the received wireless signal at point 302, and the analog to digital converter (ADC) 614 is configured to digitize the sampled amplitude received from the amplitude detector 604.

Example details for how the controller 616 measures, increases, and decreases the wireless device's 600 bandwidth and quality-factor are now discussed.

In one example embodiment, the controller 616 causes the signal generator 610 to simultaneously inject (at point 302) three test signals at three different frequencies. In another example embodiment, the three test signals are sequentially injected. In yet other example embodiments, greater or fewer than three test signals are used.

The controller 616 then receives measured voltages corresponding to the test signal from the amplitude detector 604, via the ADC 614, and calculates the communications channel bandwidth of the wireless device 600. The controller 616 determines the communication signal bandwidth of the wireless device 600 based on a comparison between the test signals and the measured voltages.

Various offset frequencies can be used. For example, a first injected frequency could be 150 kHz below a second frequency (i.e. the wireless device 600 channel's center frequency), and a third frequency could be 150 kHz above the second/center frequency.

If the bandwidth too narrow (i.e. the Q-factor is too high), adding extra loss in the wireless device 600 will increase the bandwidth and reduce the Q-factor. To accomplish this, the controller 616 adjusts resistor bank Rt to effectively increase resistance R1 of the short loaded dipole portion 120. This added resistance lowers the quality-factor of the wireless device 600.

If the bandwidth is too wide (i.e. the Q-factor is too low) adding extra gain in the wireless device 600 will decrease the bandwidth and increase the Q-factor. To accomplish this, the controller 616 either calculates or accesses a table containing gain settings versus bandwidth for the wireless device 600.

The controller 616 activates the phase shifter 606 and the feedback amplifier 608 circuits and adjusts the feedback amplifier's 608 gain based on the required bandwidth/Q-factor. The feedback amplifier 608 injects the amplified positive feedback signal from the communications signal interface 404 at the output of the LNA 160 to the LNA's 160 input across points 302 and 304. As such the Q-factor of the wireless device 600 can be increased and the bandwidth decreased.

Example applications of the above circuit adjustments are now discussed. Large wearable devices can have antenna Q-factors as high as 50. This results in a small wireless device 600 bandwidth of 209 kHz for a small loop antenna 105 inductance of 3.8 µH. If the wireless signals require a communication bandwidth of at least 400 kHz, then the effective resistance of R1 could be set to 14.7 kOhm to reduce the Q-factor and widen the wireless device's 600 bandwidth.

In small wearable devices, however, the antenna Q-factor can be too low, such that the wireless signals are lost in the noise in the wireless device's 600 receive mode. The positive feedback decreases the operational bandwidth of the wireless device 600 there by increasing the Q-factor for better signal reception and/or transmission.

The wireless device 600 in various example embodiments can be a wearable device, an earbud, a wristband, a smart-watch, or a sensor.

Figure 7:
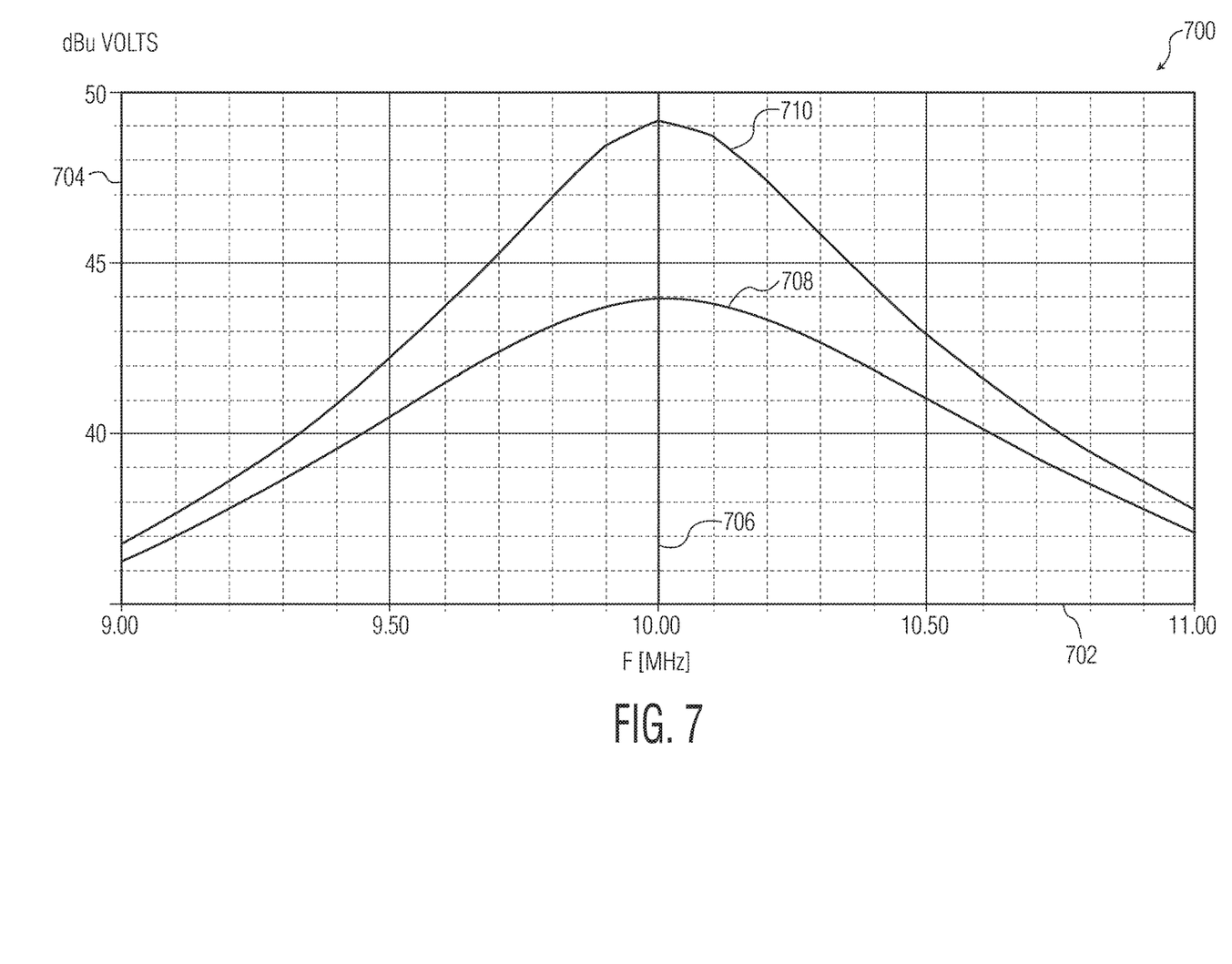
FIG. 7 is an example transfer function for the wireless device.

FIG. 7 is an example 700 transfer function for the wireless device 600. In this example 700, the small loop antenna portion 105 has an inductance of 3.8 µH and the short loaded dipole portion 120 has an equivalent capacitance of 4.7 pF. The wireless device is tuned to a communication center frequency 702 of 10 MHz.

For the no feedback voltage waveform 708, measured at input to LNA 160 between points 302 and 304, there is no feedback signal activated and the bandwidth is 1 MHz, this is the lower waveform. In this case the amplitude of the signal at resonance is 44 dBµV.

For the positive feedback voltage waveform 710, measured at input to LNA 160 between points 302 and 304), the positive feedback signal is activated and aligned by the controller 606. Here the bandwidth is set at 600 kHz and the amplitude at the communicating frequency is 49 dB V.

In this example 700, the bandwidth has a required wireless communication signal bandwidth and gains 5 dB in link budget.

The positive feedback techniques of the wireless device 600 discussed above enable a fast adaptation of a wireless device's bandwidth and Q-factor. This adaptation can be done continuously and dynamically while the wireless device is in operation, by interleaving the bandwidth and Q-factor adjustments between the wireless device's data transmissions. These positive feedback techniques also improve the communication range of such wireless devices.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A circuit for varying a quality-factor of a wireless device:
    wherein the wireless device includes an antenna tuning circuit and a communications signal interface;
    comprising, a quality-factor circuit having a feedback circuit;
    wherein the feedback circuit is configured to be coupled between the antenna tuning circuit and the communications signal interface;
    wherein the quality-factor circuit is configured to measure an antenna system bandwidth of the wireless device; and
    wherein the feedback circuit is configured to apply positive feedback to the antenna tuning circuit if the measured bandwidth is greater than a maximum communication signal bandwidth.

2. The device of claim 1:
    wherein the maximum bandwidth varies with a type of communication signal received by the wireless device.

3. The device of claim 2:
    wherein the type of communication signal is at least one of: an NFEI signal, or an RF signal.

4. The device of claim 2:
    wherein the type of communication signal is an NFEMI signal.

5. The device of claim 2:
    wherein the type of communication signal is an NFMI signal.

6. The device of claim 1:
    wherein the feedback circuit is configured to increase the positive feedback if at least one of: a decrease in signal strength, amplitude distortion, phase distortion, non-linear group delay, or an antenna system bandwidth increase, is detected at the communications signal interface.

7. The device of claim 1:
    wherein the feedback circuit is configured to decrease the positive feedback if oscillation in the wireless device is detected.

8. The device of claim 1:
    wherein the quality-factor circuit is configured to measure the antenna system bandwidth between subsequent communication signal receptions within the wireless device.

9. The device of claim 1:
    wherein the feedback circuit is configured to identify a level for the positive feedback from a table containing a set of positive feedback levels corresponding to a set of measured antenna system bandwidths.

10. The device of claim 1:
    wherein the feedback circuit is configured to go into a standby mode if the measured bandwidth is less than the maximum communication signal bandwidth.

11. The device of claim 1:
    wherein the feedback circuit is configured to increase a resistance in the antenna tuning circuit if the measured bandwidth is less than a minimum communication signal bandwidth.

12. The device of claim 1, wherein the quality-factor circuit is configured to:
    inject a set of test signals into the antenna tuning circuit;
    measure a set of voltages generated by the antenna tuning circuit in response to the test signals; and
    determine the antenna system bandwidth of the wireless device based on a comparison between the test signals and the measured voltages.

13. The device of claim 12:
    wherein at least one of the test signals is at a center frequency of the communication signal.

14. The device of claim 13:
    wherein at least two of the test signals are equally offset from the center frequency.

15. The device of claim 1:
    further comprising the wireless device; and
    wherein the positive feedback decreases the antenna system bandwidth and increases a quality-factor of the wireless device.

16. The device of claim 15:
    wherein the wireless device is at least one of: a wearable device, an earbud, a wristband, a smartwatch, or a sensor.

17. The device of claim 15:
    wherein the wireless device is configured as a receiver.

18. The device of claim 1:
    wherein the communications signal interface is configured to output a communications signal; and
    wherein the positive feedback is configured to feed the communications signal back into the antenna tuning circuit.

19. An article of manufacture including at least one non-transitory, tangible machine readable storage medium containing executable machine instructions for adjusting a bandwidth of a wireless device, comprising:
    wherein the wireless device includes an antenna tuning circuit and a communications signal interface;
    wherein the article includes a quality-factor circuit having a feedback circuit;
    wherein the feedback circuit is configured to be coupled between the antenna tuning circuit and the communications signal interface;
    wherein the instructions include,
        measuring an antenna system bandwidth of the wireless device; and
        applying positive feedback to the antenna tuning circuit if the measured bandwidth is greater than a maximum communication signal bandwidth.

20. The article of claim 19, wherein the instructions further include:
    increasing a resistance in the antenna tuning circuit if the measured bandwidth is less than a minimum communication signal bandwidth.

* * * * *